US005553871A

United States Patent [19]

Rowe et al.

[11] Patent Number: 5,553,871

[45] Date of Patent: Sep. 10, 1996

[54] FLUIDTIGHT DOOR GASKET

[75] Inventors: Marlin D. Rowe, Newark, Del.; Francis A. McMullin, Upper Darby, Pa.

[73] Assignee: The United States of America as represented by the Secretary of the Navy, Washington, D.C.

[21] Appl. No.: 241,919

[22] Filed: May 12, 1994

[51] Int. Cl.[6] .............................. F16J 15/50; E06B 7/16

[52] U.S. Cl. .............................. 277/177; 277/214; 49/483.1; 49/489.1

[58] Field of Search .............................. 277/214, 177; 49/483.1, 489.1

[56] References Cited

U.S. PATENT DOCUMENTS

| | | | |
|---|---|---|---|
| 654,073 | 7/1900 | Olinger | 277/214 |
| 2,421,400 | 6/1947 | Young | 49/483.1 |
| 3,366,392 | 1/1968 | Kennel | 277/177 |
| 4,614,348 | 9/1986 | Fournier | 277/177 |
| 4,702,482 | 10/1987 | Oseman | 277/177 |
| 5,156,410 | 10/1992 | Hom et al. | 277/177 |
| 5,216,840 | 6/1993 | Andrews | 49/483.1 |

FOREIGN PATENT DOCUMENTS

| | | | |
|---|---|---|---|
| 1370494 | 10/1974 | United Kingdom | 49/483.1 |

OTHER PUBLICATIONS

Military Specification for "Rubber Gasket Material, 45 Durometer Hardness," Mil. Spec. MIL-R-900F, dtd Mar. 30, 1973, 7 pp., sprsding MIL-R-900E, dtd Nov. 3, 1966.

Military Specification for "Gaskets, Glass-Metallic Cover, Silicone Core," Mil. Spec. MIL-G-17927C, dtd Mar. 27, 1991, 13 pp.

Federal Specification for "Rubber, Silicone," Fed. Spec. ZZ-R-765E/Gen, dtd Dec. 20, 1991, 26 pp, superceding ZZ-R-765D/Gen, dtd May 10, 1989.

Federal Specification for "Rubber, Silicone," Fed. Spec. ZZ-R-765D/Gen, 24 pp., dtd May 10, 1989, superseding ZZ-R-765C/Gen, dtd. Feb. 21, 1986.

*Primary Examiner*—William A. Cuchlinski, Jr.
*Assistant Examiner*—John L. Beres
*Attorney, Agent, or Firm*—Howard Kaiser

[57] ABSTRACT

A gasket for watertight/airtight sealing of individual-acting movable structural closures (such as shipboard doors, hatches and scuttles), featuring utilization of silicone rubber material in a specifically proportioned rectangular-parallelepipedoid shape having two 45° chamfers and a lengthwise intermediate semicylindrical groove. The gasket's superior sealing properties derive from its configuration and composition as well as its resultant unsusceptibility to permanent set. The gasket is softer and hence easier and quicker to install, performs better in a fire environment, has a significantly longer life expectancy, requires far less maintenance and overall affords substantial savings.

15 Claims, 4 Drawing Sheets

FLUIDTIGHT DOOR GASKET

The invention described herein may be manufactured and used by or for the Government of the United States of America for governmental purposes without the payment of any royalties thereon or therefor.

BACKGROUND OF THE INVENTION

The present invention relates to seals or packings used for preventing escape of gas or liquid through or from structural closures, more particularly to gaskets used for preventing such escape through or from manually-operated movable door-like closures.

Naval vessels are frequently designed to contain one or more watertight/airtight, quick-acting, individual-acting movable structural closures, such as doors, hatches and scuttles, which selectively permit or deny passage between locations or compartments.

Noteworthy among gasket designs which the U.S. Navy has utilized for purposes of sealing such closures is the "MIL-R-900" gasket. The MIL-R-900 gasket has been serviceable but has been considered neither problem-free nor performance-optimal.

The MIL-R-900 material has tended to develop permanent set in the gasket, thereby negating all or vitually all watertight/airtight qualities of the gasket. The MIL-R-900 gaskets have been changed out approximately every six months due to permanent set, deterioration from ultraviolet degradation, drying out and damage.

Installation of the MIL-R-900 gasket has averaged about 2.5 hours and recovery time (for allowing the gasket to recover from the installation process prior to finish cut and testing) has averaged about 24 hours; hence, utilization of the MIL-R-900 gasket has proven to be labor-intensive.

An additional concern for the U.S. Navy has been the ability of a gasket to withstand fire and concomitant high temperatures and toxic fumes aboard vessels, e.g., at shipboard firezone boundaries. The U.S. Navy has been using the "MIL-G-17927" gasket, specificially designed for firezone boundaries, which costs about $15 to $20 per foot for the U.S. Navy to procure, significantly more expensive than the $.50 to $1 per foot MIL-R-900 standard gasket.

SUMMARY OF THE INVENTION

In view of the foregoing, it is an object of the present invention to provide a gasket for watertight/airtight, quick-acting, individual-acting structural closures (e.g., doors, hatches and scuttles) which affords better watertight/airtight sealing properties.

It is a further object of the present invention to provide such a gasket which has extended useful life expectancy.

Another object of this invention is to provide such a gasket which has improved maintainability.

Another object is to provide such a gasket which admits of easier and quicker installation.

Another object is to provide such a gasket which performs better in a fire environment.

Yet another object is to provide such a gasket which affords better performance economically.

The present invention provides a gasket for fluidtight sealing of a closure, comprising a solid rectangular-parellelepipedoid member made of silicone rubber material. The solid rectangular-parallelepipedoid member has a selected finite length and a height approximately 40% its width.

The member is characterized by having two chamfers and one groove, thereby deviating from approximately rectangular-parallelepiped form.

Each chamfer has a breadth approximately 5% the member's width. Each chamfer is located opposite, with respect to a lengthwise-widthwise surface of the member, the other chamfer. Each chamfer is located at an approximately 45 degree angle along a lengthwise junction of the lengthwise-widthwise surface with a lengthwise-heightwise surface of the member.

The groove is approximately semicylindrical and is located approximately parallel to and approximately intermediate the chamfers. The groove has a radius which is approximately 15% the member's width.

The gasket in accordance with the present invention configurationally features dimensional specificity along with deviation from a rectangular-parallelepiped shape by virtue of the symmetrical presence of two lengthwise chamfers and a lengthwise intermediate semicylindrical groove; in accordance with this invention, the chamfers are each disposed at a specific angle of 45 degrees and the chamfer breadth, member width, member height and groove radius all extend in specific proportions.

The gasket in accordance with this invention compositionally features utilization of solid silicone rubber material; this invention's silicone rubber material synergistically combines with its configurational features to produce a superior gasket.

Testing has confirmed the superiority of the gasket in accordance with the present invention. The U.S. Navy recently conducted a series of tests of an embodiment of the present invention along with two other gaskets in terms of performance in fire environment as well as in terms of hydrostatics, ease of installation, maintainance and lifecycle.

Three gaskets were tested: (1) the aforementioned MIL-R-900 standard gasket; (2) the aforementioned MIL-G-17927C firezone gasket; and, (3) the "ZZ-R-765" gasket, which was an embodiment of the gasket in accordance with the present invention. The test results established the superiority of the ZZ-R-765 gasket to both the MIL-R-900 gasket and the MIL-G-17927C gasket in all aspects which were tested.

Each of the three gaskets was installed in doors in various tests. On average, it took about two hours to install the MIL-R-900 gasket, about two hours to install the MIL-G-17927C gasket, and about twenty minutes to install the ZZ-R-765 gasket.

During in-service testing, each gasket remained on active test ships USS WHIDBEY ISLAND and USS MCINERNEY for about fifteen months; contrary to the MIL-R-900 and MIL-G-17927C gaskets, the ZZ-R-765 gasket for the entire fifteen month period required no maintanence and showed no signs of degradation or damage from ultraviolet light.

During hydrostatic testing the MIL-R-900 and MIL-G-17927C gaskets leaked at about 5 to 10 psi. The ZZ-R-765 gasket had only minor leakage at about 30 psi.

The U.S. Navy was interested in testing fire conditions analogous to those which had existed on the USS STARK following the missile attack thereof which took place some years ago; those fire conditions were more closely matched by the "UL 1709" tests (2,000° F.) than by the previously used "ASTM E 119" tests (1,550° F.). Tests approximating the UL 1709 tests were conducted by the U.S. Navy on the test ship ex-USS SHADWELL in order to determine how the respective gaskets would perform in a fire environment. The tests were conducted with a two-inch vacuum to emulate a higher A/C, ventilation or CPS pressure on the fireside compartment.

During the fire test, the MIL-R-900 gasket lasted about six minutes before burn-through occurred, the MIL-G-17927C gasket lasted about three to five minutes before burn-through occurred, and the ZZ-R-765 gasket lasted about twenty-six minutes; it is noted that after 26 minutes the ZZ-R-765 gasket started to smoke and flame, but burn-through from the fire source was at no time evident.

The MIL-R-900 gasket rapidly burned away, creating its own smoke and flame, as was to be expected. Surprisingly, however, the MIL-G-17927C gasket was demonstrably deficient under fire conditions for which it was specifically designed. The MIL-G-17927C gasket immediately allowed smoke to pass through the boundary, indicating that the MIL-G-17927C gasket is not a satisfactory airtight or watertight seal. As the test progressed the MIL-G-17927C gasket actually burned with a large flame and gave off smoke. In sum the MIL-G-17927C gasket proved to provide inadequate protection for shipboard firezone watertight\airtight doors.

The ZZ-R-765 gasket, on the other hand, lasted about twenty-six minutes before it off-gassed and created a small flame and quantity of smoke; it did not allow smoke and flame from the fire source to pass the firezone boundary. As soon as the fire was extinguished, the seal was found to maintain a fluidtight boundary. The ZZ-R-765 gasket actually proved to be clearly the best gasket presently available to the U.S. Navy for firezone boundaries.

Another feature of the gasket in accordance with the present invention is that it does not, as contrasted with gaskets conventionally known in the art, tend to permanently set. The outstanding quality of resistance to permanent set of the gasket according to this invention is attributable to its configuration in combination with its material composition. The present invention's better sealing properties derive from its configuration and composition as well as its resultant unsusceptibility to permanent set. The MIL-R-900 gasket, by contrast, tends toward permanent set of at least a portion thereof. For example, a MIL-R-900 gasket of one-half inch thickness would tend toward permanent set of at least about one-eighth of an inch, which corresponds to the typical compression depth of a shipboard door's knife edge.

The present invention is softer than conventional gaskets. The silicone rubber material of the present invention is preferably on the order of 30 durometers as contrasted with the appreciably harder 45 durometer material of the MIL-R-900 gasket. Consequently, less force is required to dog a door which is sealed with the gasket of the present invention than is required to dog a door which is sealed with a gasket conventionally known to the U.S. Navy. On a typical quick-acting fluidtight shipboard door, the MIL-R-900 gasket requires about 100 to 110 pounds of force on the handle to dog the door, as compared with about 60 to 70 pounds required by the 30 durometer ZZ-R-765 gasket embodiment of the present invention. Less physical effort means less time as well as less friction on moving parts; the twenty minute average to install the ZZ-R-765 gasket embodiment of the present invention, with no recovery time, compares quite favorably with the average two hours to install and 24 hours of recovery time for the MIL-R-900 gasket.

The gasket of the present invention has a significantly longer life expectancy than that of the U.S. Navy's conventional gaskets. The MIL-R-900 gasket, for example, is normally replaced about every six months. Furthermore, the MIL-R-900 gasket requires maintenance quarterly; the gasket of the present invention requires none or virtually none. Accordingly, in view of life expectancy and maintenance considerations, the approximately $2 per foot procurement price for the ZZ-R-765 gasket is economical in comparison with the $.50 to $1 per foot for the MIL-R-900 gasket as well as the $15 to $20 per foot for the MIL-G-17927 gasket.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described by way of example, with reference to the accompanying drawings, wherein like numbers indicate the same or similar components, and wherein.

DETAILED DESCRIPTION OF THE INVENTION

Figure 1A:
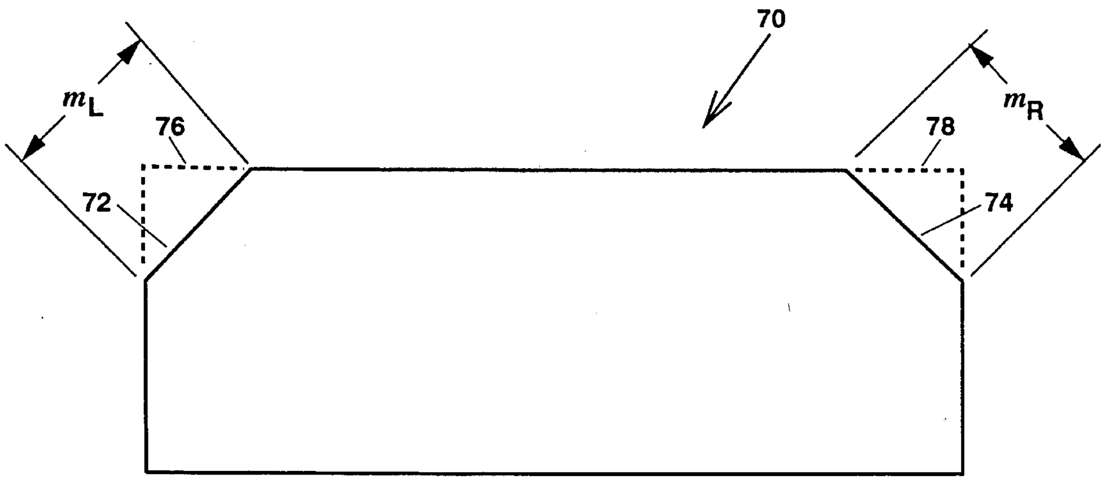
FIG. 1(a) PRIOR ART
FIG. 1(*a*) and FIG. 1(*b*) are diagrammatic cross-section views of the MIL-R-900 gasket and the MIL-G-17927C gasket, respectively.
Figure 1B:
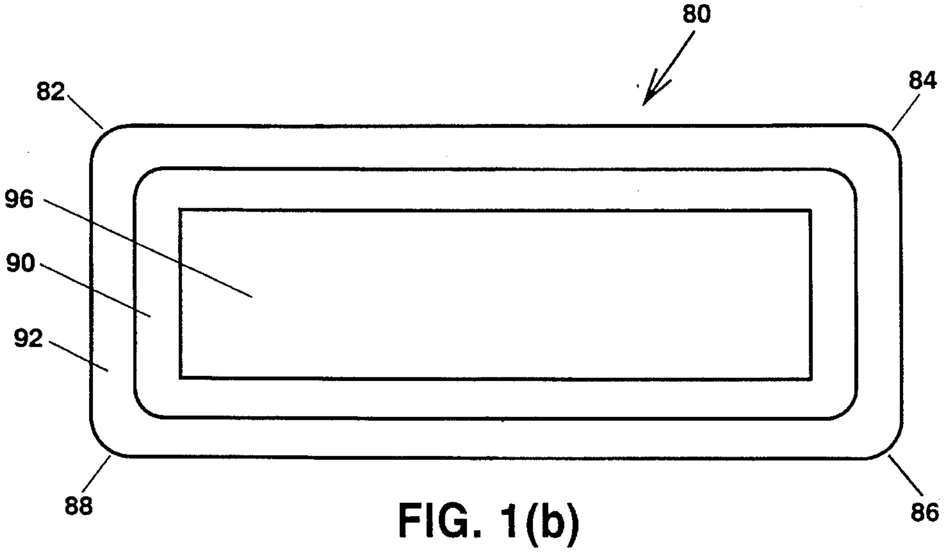
FIG. 1(b) PRIOR ART

Reference now being made to FIG. 1(*a*), the MIL-R-900 gasket is shown in one of two of its configurations conventionally used by the U.S. Navy. MIL-R-900 gasket 70 shown cross-sectionally in FIG. 1(*a*) is approximately in the form of a solid rectangular-parallelopiped except for the presence of two approximately congruent chamfers, left chamfer 72 having breadth $m_L$ and right chamfer 74 having breadth $m_R$. The other MIL-R-900 gasket version has an approximately rectangular-parallelopiped configuration, chamfers 72 and 74 being absent as indicated by right-angled corners 76 and 78. The MIL-R-900 gasket is made of a buta-n or nitrile vulcanized rubber material. Incorporated herein by reference is the Military Specification for "Rubber Gasket Material, 45 Durometer Hardness," Military Specification MIL-R-900F, dated 30 Mar. 1973, 8 pages, superceding MIL-R-900 E, dated 3 Nov. 1966.

With reference to FIG. 1(*b*), MIL-G-17927C gasket 80 is about 55 durometers. Cross-sectionally viewed MIL-G-17927C gasket 80 has slightly rounded corners 82, 84, 86 and 88. Inner layer 90 and outer layer 92 are each made of braided metallic-wire-reinforced fiberglass. Core 96 is made of silicone. Silicone rubber covers outer layer 92 and is used to adhere inner layer 90 to outer layer 92 as well as adhere inner layer 90 to silicone core 96. Incorporated herein by reference is the Military Specification for "Gaskets, Glass-Metallic Cover, Silicone Core," Military Specification MIL-G-17927C, dated 27 Mar. 1991, 11 pages.

Figure 2:
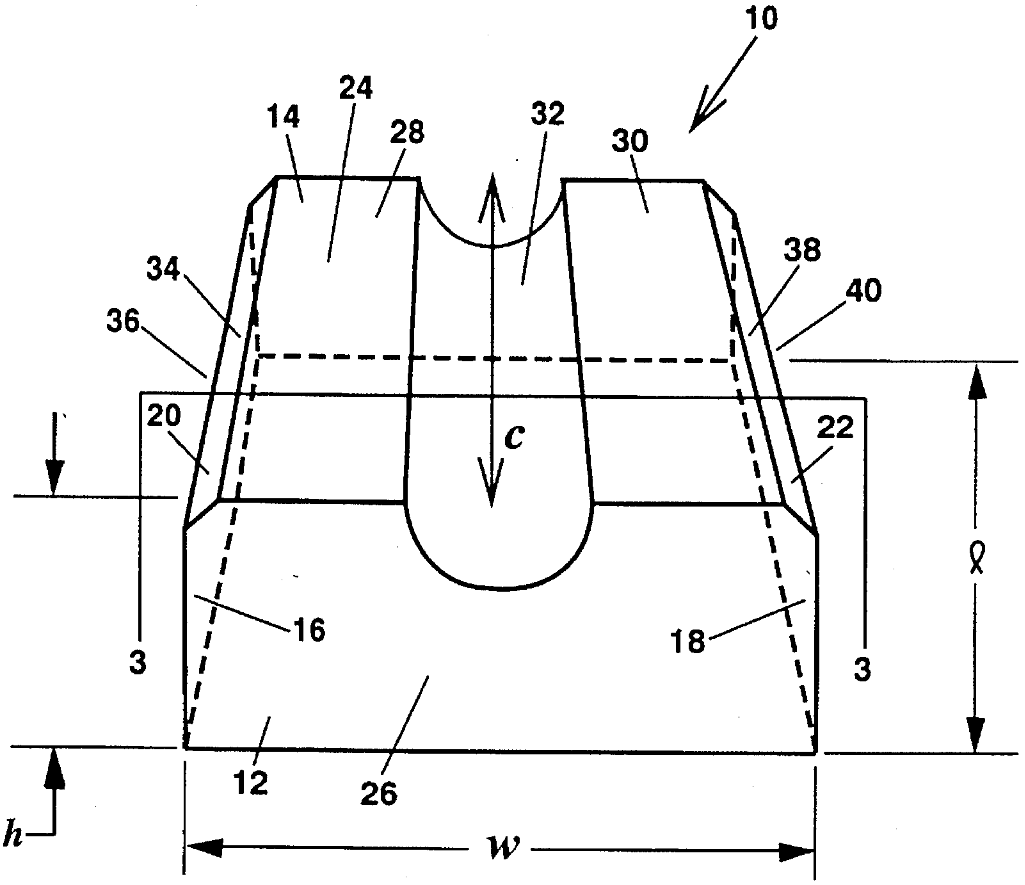
FIG. 2 is a diagrammatic top perspective view of a gasket in accordance with the present invention.

Referring now to FIG. 2, the gasket in accordance with the present invention is rectilinear solid member 10 having length l, width w, and height h. Length l for most embodiments of this invention will actually be considerably greater relative to width w, and height h than appears for illustrative purposes in FIG. 2.

Gasket member 10 has end faces 12 and 14, left lateral face 16, right lateral face 18, left chamfer face 20, right chamfer face 22, upper face 24 and lower face 26. End faces 12 and 14 are lengthwise opposite, approximately congruent and approximately parallel. Left later face 16 and right lateral face 18 are widthwise opposite, approximately congruent and approximately parallel. Upper face 24 and lower face 26 are heightwise opposite. Left chamfer face 20 and right chamfer face 22 are approximately congruent. End faces 12 and 14, left lateral face 16, right lateral face 18, left chamfer face 20, right chamfer face 22 and lower face 26 are each approximately planar.

Upper face 24 has left approximately planar portion 28, right approximately planar portion 30 and lengthwise groove 32 which is interposed between left approximately planar portion 28 and right approximately planar portion 30. Left approximately planar portion 28 and right approximately planar portion 30 are approximately congruent and approximately coplanar.

Left chamfer face 20 has first left lengthwise edge 34 and second left lengthwise edge 36. First left lengthwise edge 34 and second left lengthwise edge 36 are approximately parallel. Right chamfer face 22 has first right lengthwise edge 38 and second right lengthwise edge 40. First right lengthwise edge 38 and second right lengthwise edge 40 are approximately parallel.

Groove 32 joins end faces 12 and 14 and is approximately parallel to and approximately intermediate left lateral face 16 and right lateral face 18. Groove 32 is semicylindrical, having imaginary center line c.

Figure 3:
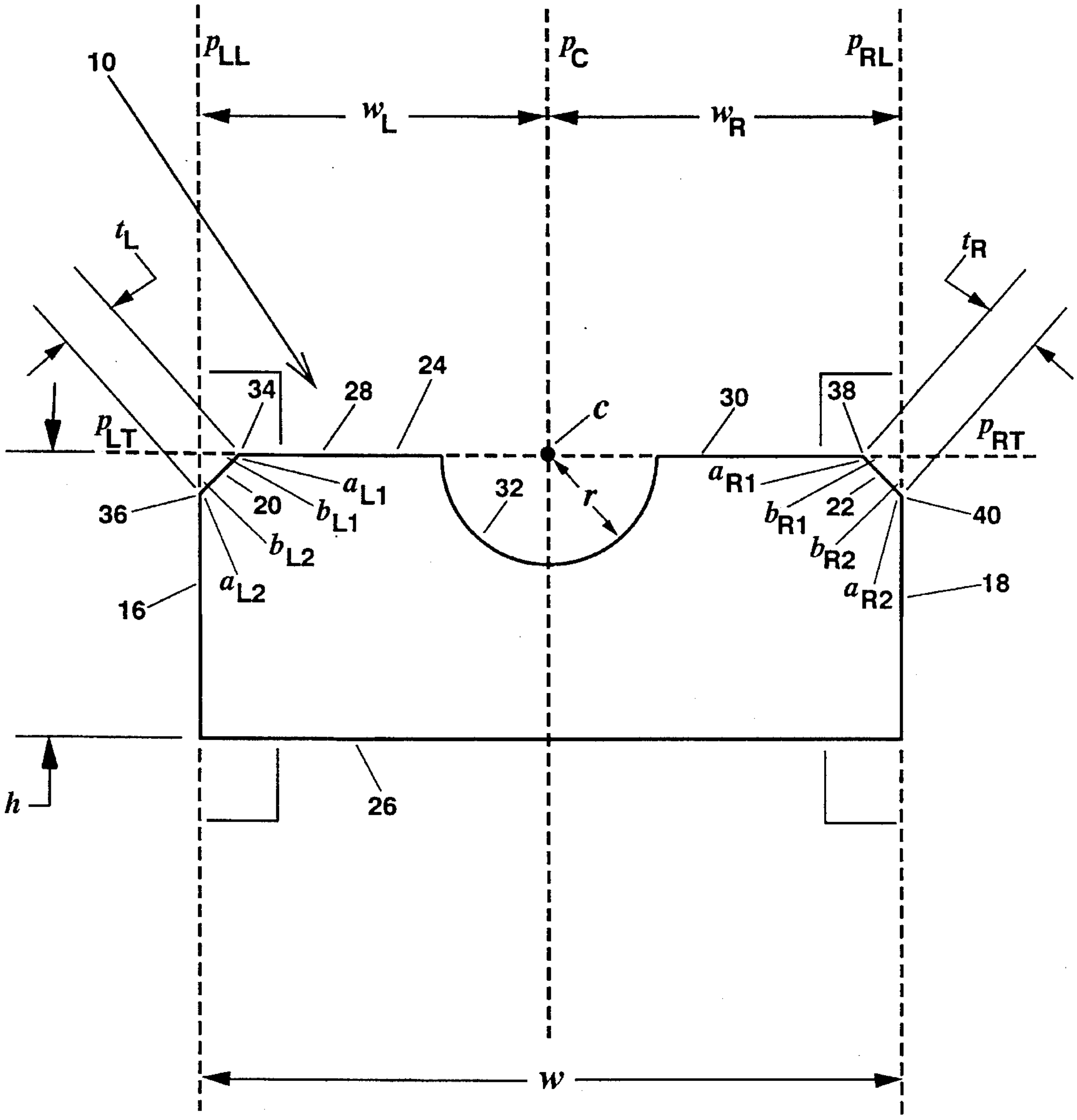
FIG. 3 is a diagrammatic cross-section view of the gasket in FIG. 2 as taken along line 3—3 in FIG. 2.

With reference to FIG. 3, solid rectangular-parellelepipedoid gasket member 10 appears as a planar rectangloid. Groove 32 appears as a semicircle and imaginary center line c appears as its center point. Left lateral face 16, right lateral face 18, left chamfer face 20, right chamfer face 22, upper face 24 and lower face 26 appear as sides of planar rectangloid gasket member 10.

Left lateral face 16 and right lateral face 18 are approximately parallel at a distance from each other which is member width w. Left lateral face 16 and lower face 26 are approximately perpendicular. Right lateral face 18 and lower face 26 are approximately perpendicular. Left substantially planar portion 28 and right approximately planar portion 30 are each approximately parallel to lower face 26, each at approximately the same distance which is member height h.

Imaginary plane $P_c$ passes through line c parallel to left lateral face 16 and right lateral face 18. Left half-width $w_L$ is the distance between imaginary plane $P_c$ and left lateral face 16. Right half-width $w_R$ is the distance between imaginary plane $P_c$ and right lateral face 18. Left half-width $w_L$ is approximately equal to right half-width $w_R$, each of which distance is approximately equal to one-half member width w.

Left chamfer face 20 shares first left lengthwise edge 34 with left approximately planar portion 28 and shares second left lengthwise edge 36 with left lateral face 16. Right chamfer face 22 shares first right lengthwise edge 38 with right approximately planar portion 30 and shares second right lengthwise edge 40 with right lateral face 18. Imaginary center line c and lengthwise edges 34, 36, 38 and 40 appear as points in FIG. 3.

Left chamfer face 20 and upper face 24 form angle $a_{L1}$ at first left lengthwise edge 34. Left chamfer face 20 and left lateral face 16 form angle $a_{L2}$ at second left lengthwise edge 36. Right chamfer face 22 and upper face 24 form angle $a_{R1}$ at first right lengthwise edge 38. Right chamfer face 22 and right lateral face 18 form angle $a_{R2}$ at second right lengthwise edge 40. Angle $a_{L1}$ approximately equals 135 degrees. Angle $a_{L2}$ approximately equals 135 degrees. Angle $a_{R1}$ approximately equals 135 degrees. Angle $a_{R2}$ approximately equals 135 degrees. Angle $a_{L1}$, angle $a_{L2}$, angle $a_{R1}$ and angle $a_{R2}$ are hence approximately equal to each other, each angle being approximately equal to 135°.

Imaginary plane $P_{LL}$ through left lateral face 16 is approximately perpendicular to imaginary plane $P_{Lt}$ through left approximately planar portion 26. Imaginary plane $p_{RL}$ through right lateral face 18 is approximately perpendicular to imaginary plane $P_{RT}$ through right approximately planar portion 28. Angle $b_{L1}$, angle $b_{L2}$, angle $b_{R1}$ and angle $b_{R2}$ are approximately equal to each other, each angle being approximately equal to forty-five degrees.

Member height h, which is approximately the distance between left approximately planar portion 28 and lower face 26 as well as approximately the distance between right approximately planar portion 30 and lower face 26, is approximately 40% of member width w. The aforediscussed ZZ-R-765 gasket embodiment of the present invention which was tested by the U.S. Navy has height h approximately equal to one-half inch, width w approximately equal to one and one-fourth inches, half-width $w_L$ approximately equal to five-eighths of an inch, and half-width $w_R$ approximately equal to five-eighths of an inch.

Radius r, the distance between center line c and semicylindrical groove 32, equals approximately 15% of member width w. The aforediscussed ZZ-R-765 gasket embodiment has r approximately equal to three-sixteenths of an inch.

Left chamfer face 20 has a breadth $t_L$, which is the distance between first left lengthwise edge 34 and second left lengthwise edge 36. Right chamfer face 22 has a breadth $t_R$, which is the distance between first right lengthwise edge 38 and second right lengthwise edge 40. Breadth $t_L$ and breadth $t_R$ are approximately equal. Breadth $t_L$ approximately equals 5% of member width w. Breadth $t_R$ approximately equals 5% of member width w. It is noted that left chamfer breadth $m_L$ and right chamfer breadth $m_R$ shown in FIG. 1(*a*) are appreciably greater relative to the overall dimensions of the MIL-R-900 gasket than are breadth $t_L$ and breadth $t_R$ relative to the overall dimensions of the gasket according to the present invention.

"Silicone rubber" as used herein is any composition of matter containing at least one-half silicone and exhibiting physical properties of elasticity similar to those of natural rubber. Incorporated herein by reference is the Federal Specification for "Rubber, Silicone," Federal Specification ZZ-R-765E/Gen, dated 20 Dec. 1991, 26 pages, superseding ZZ-R-765D/GEN, dated 10 May 1989. It is noted that material compositions for the silicone rubber material are not set forth in Federal Specification ZZ-R-765E/Gen; instead, Federal Specification ZZ-R-765E/Gen at page 4, paragraph 3.3 states that "[t]he material shall be silicone rubber formulated and processed to meet the requirements of this specification." Specification ZZ-R-765E/Gen further states, inter alia, as follows:

1. SCOPE AND CLASSIFICATION 1.1. Scope. This specification covers three classes of silicone rubber in various grades.

1.2 Classification. The silicone rubber shall be of the following classes and grades as specified (see 6.2). The designated grade number corresponds to the nominal Shore-a-durometer hardness value.

Class 1A—Low temperature resistant. Grade-40, 50, 60, 70 and 80

Class 1B—show temperature resistant aria low compression set at high temperature Grade-40, 50, 68, 70 and 80

Class 2A—High temperature resistant Grade-25, 40, 50, 68, 70 and 80

Class 2B—High temperature resistant and low compression set Grade-25, 40, 50, 60, 70 and 80

Class 3A—low temperature, hear and flex resistant Grade-30, 50 and 60

Class 3B—fear and flex resistant Grade-30, 50, 60, 70 and 80

3. REQUIREMENTS 3.1. First article. When specified (see 6.2), a sample shall be subjected to first article inspection (see 6.3) in accordance with 4.21.

3.2 Specification sheets. The individual item requirements shall be as specified herein and in accordance with the applicable specification sheets. In the event of any conflict between the requirements of this document and the specification sheet, the latter shall govern.

3.3 Material. The material shall be silicone rubber formulated and processed to meet the requirements of this specification (see 4.1.1). When applicable, formulation approval shall be obtained from the appropriate medical activity (see 6.5).

3.4 Physical and mechanical properties. Unless otherwise specified in the applicable specification sheet, the silicone rubber shall meet the physical and mechanical properties specified in Table I for the applicable Class and Grade. The rests shall be conducted in accordance with 4.2.2.1.3.

3.5 Form. The silicone rubber shall be in the form of sheets, strips, or tape, extruded shapes or tubing, or moled shapes (see 6.2), of the specified tolerance (see 4.2.2.1.2.2) or specification sheets (see 6.8)as applicable.

3.6 Dimensions and Tolerances. Dimensions and tolerances shall be in accordance with the applicable part drawing or as indicated in the contract or purchase order (see 6.2). If no tolerances are specified, A-3 commercial tolerances of the Rubber Manufacturer's Association (RMA) Rubber Handbook as shown in table II, shall apply for molded solid rubber products and the commercial tolerances of the RMA Rubber Sheet Packing Handbook, as shown in table III, shall apply for sheet packing. Commercial tolerances as shown in table IV, V, and VI shall apply for extruded shapes extruded tubing and calendered sheet, respectively. Dimensions and tolerances for O-Rings shall be as specified in AS 568, or in accordance with the applicable part drawing for non-standard sizes see (6.2).

3.7 Extruded tubing.

3.7.1 Length of tubing. Unless otherwise specified in the contract or purchase order (see 6.2) the silicone rubber tubing shall be furnished in coils containing 100, 200, 500 or 1,000 feet per coil. Each coil shall contain not more than three individual lengths of tubing per 100 feet, and no individual length of tubing shall be less than 15 feet.

TABLE I

Physical and mechanical properties of silicone rubber.

| | Classes 1A and 1B | | | | |
|---|---|---|---|---|---|
| Physical property | Grade 40 | Grade 50 | Grade 60 | Grade 70 | Grade 80 |
| Unaged: | | | | | |
| Hardness, ±5, Shore-A-durometer | 40 | 50 | 60 | 70 | 80 |
| Tensile strength, minimum MPa (psi) | 4.83 (700) | 4.83 (700) | 4.48 (650) | 4.14 (600) | 3.45 (500) |
| Elongation, minimum percent | 250 | 225 | 175 | 150 | 125 |
| Compression set, maximum percent 1/ | 35 | 35 | 35 | 40 | 45 |
| After oven aging: 2/ | | | | | |
| Hardness change, durometer, maximum | ±15 | ±15 | ±15 | ±15 | ±15 |
| Tensile strength change, maximum percent | –30 | –30 | –30 | –30 | –30 |
| Elongation change, maximum percent | –50 | –50 | –50 | –50 | –50 |
| Low temperature requirements: | | | | | |
| Young's modulus in flexure, 24 hours at –75° C. (–103° F.), maximum MPa (psi) 3/ | 34.5 (5,000) | 34.5 (5,000) | 69.0 (10,000) | 69.0 (10,000) | 69.0 (10,000) |
| Brittle point, minimum °C. (°F.) 4/ | –75(–103) | –75(–103) | –75(–103) | –75(–103) | –75(–103) |
| Torsional stiffness ratio, 72 hours at –75° C. (–103° F.), maximum ratio | 15 | 15 | 15 | 15 | 15 |
| Specific Gravity | Pre-production value ± 0.03 | | | | |

TABLE I-continued

Physical and mechanical properties of silicone rubber.

| | Classes 2A and 2B | | | | | | | | | | | |
|---|---|---|---|---|---|---|---|---|---|---|---|---|
| Physical property | Grade 25 | | Grade 40 | | Grade 50 | | Grade 60 | | Grade 70 | | Grade 80 | |
| Unaged: | | | | | | | | | | | | |
| Hardness, maximum Shore-A-durometer | 25 + 5,–10 | | 40 ± 5 | | 50 ± 5 | | 60 ± 5 | | 70 ± 5 | | 80 ± 5 | |
| Tensile strength, minimum MPa (psi) | 4.83 (700) | | 4.83 (700) | | 4.83 (700) | | 4.48 (650) | | 4.48 (650) | | 4.48 (650) | |
| | | | | | | | 2A | 2B | 2A | 2B | 2A | 2B |
| Elongation, minimum percent | 400 | | 240 | | 200 | | 150 | 100 | 125 | 80 | 100 | 60 |
| | | | | | | | 150 | 100 | 125 | 80 | 100 | 60 |
| | 2A | 2B | 2A | 2B | 2A | 2B | 2A | 2B | 2A | 2B | 2A | 2B |
| Compression set, maximum percent 1/ | 35 | 25 | 35 | 25 | 35 | 25 | 40 | 25 | 40 | 25 | 45 | 30 |
| After oven aging: 2/ | | | | | | | | | | | | |
| Hardness change, maximum Shore-A-durometer | ±10 | | ±10 | | ±10 | | ±10 | | ±10 | | ±10 | |
| Tensile strength change, maximum percent | –20 | | –20 | | –20 | | –20 | | –25 | | –25 | |
| Elongation change, maximum percent | –40 | | –40 | | –40 | | –40 | | –40 | | –40 | |
| Low temperature requirements: | | | | | | | | | | | | |
| Brittle Point, minimum °C. (°F.) 4/ | –62.2(–80) | | –62.2(–80) | | –62.2(–80) | | –62.2(–80) | | –62.2(–80) | | –62.2(–80) | |
| After water immersion: 5/ | | | | | | | | | | | | |
| Volume change, maximum percent | +10 | | +10 | | +5 | | +5 | | +5 | | +5 | |
| Specific Gravity | | | | | | | Pre-production value ± 0.03 | | | | | |

| | Class 3A | | |
|---|---|---|---|
| Physical property | Grade 30 | Grade 50 | Grade 60 |
| Unaged: | | | |
| Hardness, maximum Shore-A-durometer | 30 + 5,–10 | 50 ± 5 | 60 ± 5 |
| Tensile strength, minimum MPa (psi) | 5.86(850) | 8.28(1,200) | 7.59(1,100) |
| Elongation, minimum percent | 500 | 500 | 400 |
| Tear resistance, minimum kNm (ppi) | 14.00(80) | 30.63(175) | 26.25(150) |
| Compression set, maximum percent 1/ | 40 | 40 | 40 |
| After oven aging: 2/ | | | |
| Hardness change, maximum Shore-A-durometer | +10 | +10 | +10 |
| Tensile strength change, maximum percent | –25 | –40 | –35 |
| Elongation change, maximum percent | –25 | –50 | –35 |
| Low temperature requirements: | | | |
| Young's modulus in flexure, 24 hours at –75° C. (–103° F.), maximum MPa (psi) 3/ | 13.8(2,000) | 34.5(5,000) | 34.5(5,000) |
| Brittle point, minimum °C. (°F.) 4/ | –90(–130) | –90(–130) | –90(–130) |
| Torsional stiffness ratio, 72 hours at –75° C. (–103° F.), maximum ratio | 15 | 15 | 15 |
| After water immersion: 5/ | | | |
| Volume change, maximum percent | +5 | +5 | +5 |

TABLE I-continued

| Physical and mechanical properties of silicone rubber. | | | | | |
|---|---|---|---|---|---|
| Other requirements: | | | | | |
| Flex resistance, (crack growth), cycles 6/ | 40,000 | | 10,000 | | 10,000 |
| Specific Gravity | | | Pre-production value ± 0.03 | | |

| | Class 3B | | | | |
|---|---|---|---|---|---|
| Physical property | Grade 30 | Grade 50 | Grade 60 | Grade 70 | Grade 80 |
| Unaged: | | | | | |
| Hardness, maximum Shore-A-durometer | 30 ± 5 | 50 ± 5 | 60 ± 5 | 70 ± 5 | 80 ± 5 |
| Tensile strength, minimum MPA (psi) | 6.90 (1,000) | 8.28 (1,200) | 8.28 (1,200) | 7.59 (1,100) | 5.52 (800) |
| Elongation, minimum percent | 500 | 500 | 400 | 350 | 200 |
| Tear resistance, minimum kNm (ppi) | 26.25 (150) | 26.25 (150) | 26.25 (150) | 26.25 (150) | 12.25 (70) |
| Compression set, maximum percent 1/ | 25 | 20 | 25 | 25 | 40 |
| After oven aging: 2/ | | | | | |
| Hardness change, maximum Shore-A-durometer | ±5 | ±10 | ±10 | ±10 | ±10 |
| Tensile strength change, maximum percent | –20 | –25 | –30 | –30 | –25 |
| Elongation change, maximum percent | –35 | –30 | –35 | –45 | –40 |
| Low temperature requirement: | | | | | |
| Brittle point, minimum °C. (°F.) 4/ | –70(–94) | –70(–94) | –70(–94) | –70(–94) | –70(–94) |
| After water immersion: 5/ | | | | | |
| Volume change, maximum percent | +5 | +5 | +5 | +5 | +5 |
| Other requirements: | | | | | |
| Impact resilience, minimum percent | 40 | 45 | 35 | 35 | 35 |
| Flex resistance (crack growth), cycles 6/ | 500,000 | 140,000 | 50,000 | 2,500 | — |
| Specific Gravity | | | Pre-production ± 0.03 | | |

1/ The aging period shall be as follows: class 1A, 22 hours at 100° C. (212° F.); class 1B, 2A and 2B, 70 hours at 150° C. (302° F.); class 3A and 3B, 70 hours at 100° C. (212° F.).
2/ For classes 1A, 1B, 2A and 2B, 70 hours at 225° C. (437° F.); for class 3A and 3B, 70 hours at 200° C. (392° F.).
3/ Both specimens shall meet this value. For class 3A, the requirement shall be used as a referee only, if a dispute arises over the brittle point results. The requirement does not apply to class 3B.
4/ All test specimens shall not fail after single-impact blow, at the temperature specified.
5/ 70 hours at 100° C. (212° F.).
6/ No specimen shall show a crack in excess of ½ inch in length when flexed the specified number of cycles.

4.2.2.1.3 Test methods. Testing of the silicone rubber shall be in accordance with methods specified in table IX.

TABLE IX

| Test methods for physical properties. | |
|---|---|
| Physical Property | ASTM test method |
| Hardness | D2240 |
| Tensile strength | D412 |
| Elongation | D412 |
| Volume change | D471 |
| Compression set | D395 |
| Young's modulus in flexure | D797 |
| Tear resistance | D624 |
| Brittle point | D2137 |
| Torsional stiffness ratio | D1053 |
| Oven aging | D573 |
| Water immersion | D471 |
| Flex resistance | D813 |

TABLE IX-continued

| Test methods for physical properties. | |
|---|---|
| Physical Property | ASTM test method |
| Impact resilience | D2632 |
| Specify gravity | D297 |
| Rubber O-Rings | D1414 |

6.1 Intended use. The silicone rubber covered by this specification is intended generally for use under the conditions listed below. However users should consider all the requirements of this specification when selecting a class and grade of silicone rubber.

Class 1—Where resistance to extreme low temperature is required (to approximately –73° C. (–100° F.)). Class 1 material also possesses resistance to extreme high temperature (to approximately 219° C. (425°

F.)) but length of service at high temperatures is less than that of the class .2 materials. The class 1B material also possesses low compression set at high temperature.

Class 2—Where resistance to extreme high temperature is required (to approximately 219° C. (425° F.). Class 2 material possesses low temperature resistance but only to about −62° C. (−80° F.). Class 2B material also possesses low compression set.

Class 3A—Where resistance to extreme low temperature (to approximately −75° C. (103° F.)) and resistance to tearing and flexing are required. Class 3A material also possesses resistance to extreme high temperature, to approximately 204° C. (400° F.).

Class 3B—Where resistance to tearing and flexing are required, but the resistance to extreme low temperature requirement is less than that of the class 3A material. Temperature range for the class 3B material is approximately between −70° C.(−94° F.) and 204° C. (400° F.). Cost of the class 3B material should be less than that of the 3A material.

These "requirements" include the "physical and mechanical properties of silicone rubber" enumerated in "Table 1" on pages 6–10 of Federal Specification ZZ-R-765E/Gen. It is well within the level of skill of the ordinarily skilled artisan to provide a silicone rubber material or to make an object made of a silicone rubber material in accordance with desired physical and mechanical properties among those listed in Table 1 of Federal Specification ZZ-R-765E/Gen.

The ZZ-R-765 gasket which has performed so well for the U.S. Navy, as discussed hereinabove, is made of silicone rubber material ZZ-R-765E, Class 3B, Grade 30, found in Table 1, page 9 of Federal Specification ZZ-R-765E/Gen. In fact, the ZZ-R-765E, Class 3B, Grade 30 gasket is becoming a standard part of the U.S. Navy fleet. The U.S. Navy has decided to discontinue use of the MIL-G-17927gasket and has begun to replace it with the ZZ-R-765E, Class 3B, Grade 30 gasket. Moreover, the U.S. Navy is also in the process of replacing the MIL-R-900 gasket with the ZZ-R-765E, Class 3B, Grade 30 gasket. If and when these replacements are in fact fully accomplished, the ZZ-R-765E, Class 3B, Grade 30 gasket will be the gasket used in all U.S. Navy shipboard doors.

Any silicone rubber material, including any of the ZZ-R-765 silicone rubber materials classified in Table 1 of Federal Specification ZZ-R-765E/Gen, can be used for the gasket in practicing the present invention. Depending on the embodiment of the present invention, the silicone rubber composition will vary in accordance with varying desired physical and mechanical properties. For many embodiments the desired physical and mechanical properties will be akin to those pertaining to silicone rubber material ZZ-R-765E, Class 3B, Grade 30, found in Table 1, page 9 of Federal Specification ZZ-R-765E/Gen. It is noted that a silicone rubber material which is harder than the ZZ-R-765E, Class 3B, Grade 30 gasket material does not admit of as facile installation.

For most embodiments of the present invention dimensional tolerances in accordance with conventional commercial tolerances are acceptable, although more stringent tolerances may be preferred for some embodiments. The A-3 commercial tolerances of the Rubber Manufacturer's Association (RMA) Rubber Handbook for molded solid rubber products are set forth in Table II, page 11, of Federal Specification ZZ-R-765E/Gen.

Installation of the gasket in a shipboard closure, in accordance with the present invention, can generally be accomplished with the closure in place by one person in a relatively short period of time. Installation is similar for doors, hatches and scuttles.

Figure 4:
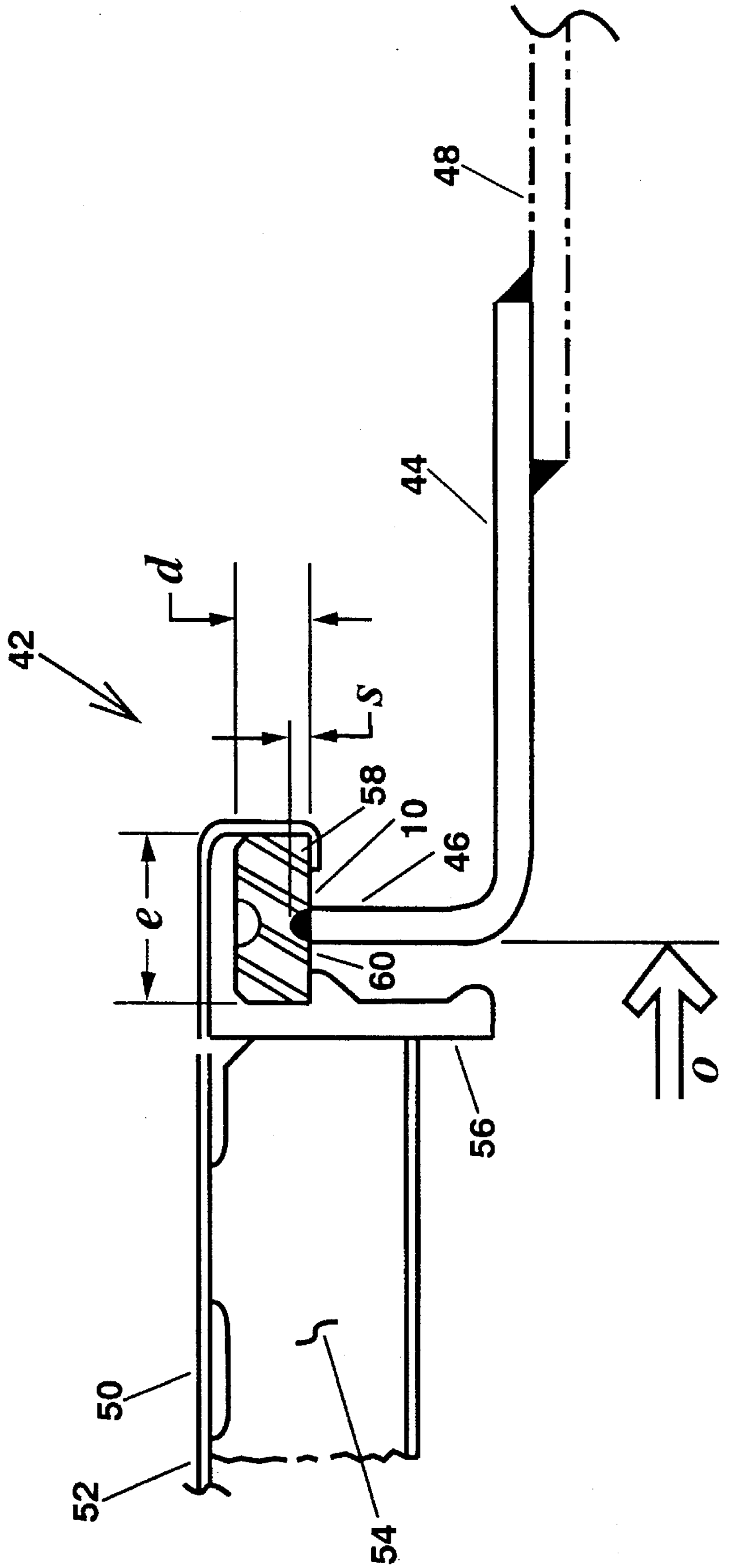
FIG. 4 is a schematic partial section plan view of a shipboard closure, illustrating installation therein of the gasket in FIG. 2.

Reference is now made to FIG. 4, which illustrates typical gasket installation in closure 42 which is a shipboard fluidtight door. Door frame 44 having knife edge 46 which surrounds clear opening o is attached to bulkhead 48. Movable door assembly 50 includes door panel 52, door panel stiffener 54, bulb angle rim stiffener 56 and gasket channel 58.

Installation of ZZ-R-765E gasket member 10 is accomplished by forcing ZZ-R-765E gasket member 10 into gasket channel 58, which is situated around the perimeter of movable door assembly 50, using firm finger pressure; this installation is typically accomplished by one person in about twenty minutes. Gasket channel 58 has channel depth d equal to one-half inch, thus corresponding to ZZ-R-765E gasket member 10 height h, and channel width e equal to one and one-fourth inch, thus corresponding to ZZ-R-765E gasket member 10 width w.

A watertight, airtight seal is achieved as movable door assembly 50 is dogged shut and exposed surface 60 of gasket member 10 is compressed against knife edge 46 of door frame 44. Gasket compression s of ZZ-R-765E gasket member 10 is typically about one-eighth of an inch.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. In a closure-sealing assembly of the type wherein a gasket is coupled with a perimetric channel having a substantially flat base surface which is approximately parallel to the imaginary plane which is approximately defined by said closure, and wherein when said closure is sealed said gasket is compressed by a perimetric flange in a direction which is approximately normal to said base surface and said imaginary plane, an improved gasket comprising:

a solid rectangular-parallelepipedoid member made of silicone rubber material and having a selected finite length and a height approximately 40% its width;

said member characterized by having two longitudinal chamfers and one longitudinal groove, thereby deviating from approximately rectangular-parallelepiped form;

said member having a first lengthwise-widthwise surface and a second lengthwise-widthwise surface which are approximately parallel to each other;

each said chamfer having a breadth approximately 5% said width of said member and being located opposite, with respect to said first lengthwise-widthwise surface of said member, the other said chamfer, at an approximately 45° angle along a lengthwise junction of said first lengthwise-widthwise surface with a lengthwise-heightwise surface of said member;

said groove being approximately semicircularly cylindrical and being located approximately parallel to and approximately intermediate said chamfers, said groove defining an imaginary approximately straight center line which approximately bisects said first lengthwise-widthwise surface, said groove having a radius which is approximately 15% said width of said member;

whereby, when said gasket is coupled with said perimetric channel, said first lengthwise-widthwise surface substantially abuts said base surface; and whereby, when said closure sealed, said gasket is compressed by said perimetric flange, contactingly with said second lengthwise-widthwise surface, in a direction which is approximately normal to said imaginary plane, said base surface, said first lengthwise-widthwise surface and said second lengthwise-widthwise surface.

2. A gasket as in claim 1, wherein said width of said member is about 1.25 inches, said height of said member is about 0.5 inches, said breadth of each said chamfer is about 0.0625 inches, and said radius is about 0.1875 inches.

3. A gasket as in claim 1, wherein said silicone rubber material is a material of a classselected from the group of classes, in accordance with Federal Specification ZZ-R-765E, consisting of Class 1A, Class 1B, Class 2A, Class 2B, Class 3A and Class 3B.

4. A gasket as in claim 3, wherein said silicone rubber material is of Class 3B and Grade 30 in accordance with Federal Specification ZZ-R-765E.

5. A gasket as in claim 1, wherein said silicone rubber material has a hardness of approximately 30 durometers.

6. A gasket as in claim 1, wherein said silicone rubber material has resistance to tearing and flexing.

7. A gasket arrangement for fluidtight sealing of a closure, comprising:

a rectilinear solid member, a channeled member; and a protruding member;

said rectilinear solid member made of silicone rubber material and having two end faces, a left lateral face, a right lateral face, a left chamfer face, a right chamfer face, an upper face and a lower face;

said end faces being lengthwise opposite, approximately congruent and approximately parallel;

said left lateral face and said right lateral face being widthwise opposite, approximately congruent and approximately parallel;

said upper face and said lower face being heightwise opposite;

said left chamfer face and said right chamfer face being approximately congruent;

said two end faces, said left lateral face, said right lateral face, said left chamfer face, said right chamfer face and said lower face each being approximately planar;

said upper face having a left approximately planar portion, a right approximately planar portion and a lengthwise groove which is interposed between said left approximately planar portion and said right approximately planar portion;

said left approximately planar portion and said right approximately planar portion being approximately congruent and approximately coplanar;

said left approximately planar portion and said lower face being approximately parallel, the heightwise distance between said left approximately planar portion and said lower face being approximately 40% of the widthwise distance between said left lateral face and said right lateral face;

said right approximately planar portion and said lower face being approximately parallel, the heightwise distance between said right approximately planar portion and said lower face being approximately 40% of the widthwise distance between said left lateral face and said right lateral face;

said groove being approximately semicircularly cylindrical and having a radius which is approximately 15% of the widthwise distance between said left lateral face and said right lateral face;

said left chamfer face having a first left lengthwise edge and a second left lengthwise edge, said first left lengthwise edge and said second left lengthwise edge being approximately parallel;

said right chamfer face having a first right lengthwise edge and a second right lengthwise edge, said first right lengthwise edge and said second right lengthwise edge being approximately parallel;

said left chamfer face sharing said first left lengthwise edge with said left approximately planar portion and sharing said second left lengthwise edge with said left lateral face and being disposed at an approximately 135° angle with respect to said left approximately planar portion and being disposed at an approximately 135° angle with respect to said left lateral face;

said right chamfer face sharing said first right lengthwise edge with said right approximately planar portion and sharing said second right lengthwise edge with said right lateral face and being disposed at an approximately 135° angle with respect to said right approximately planar portion and being disposed at an approximately 135° angle with respect to said right lateral face;

said groove joining said end faces and defining an imaginary approximately straight center line which is approximately coplanar with said left approximately planar portion and said right approximately planar portion, said groove being approximately parallel to and approximately equidistantly interposed between said first left lengthwise edge and said first right lengthwise edge;

the distance between said first left lengthwise edge and said second left lengthwise edge being approximately 5% of the widthwise distance between said left lateral face and said right lateral face;

the distance between said first right lengthwise edge and said second right lengthwise edge being approximately 5% of the widthwise distance between said left lateral face and said right lateral face;

said channeled member having a substantially flat depressed surface which is substantially contiguous said left approximately planar portion and said right approximately planar portion;

said protruding member compressingly contacting said lower face whereby the imaginary longitudinal axis which is approximately defined by said protruding member is approximately perpendicular with respect to said lower face.

8. A gasket arrangement as in claim 7, wherein said widthwise distance between said left lateral face and said right lateral face is about 1.25 inches, said heightwise distance between said left planar portion and said lower face is about 0.5 inches, said distance between said first left lengthwise edge and said second left lengthwise edge and said distance between said first right lengthwise edge and said second right lengthwise edge are each about 0.0625 inches, and said radius is about 0.1875 inches.

9. A gasket arrangement as in claim 7, wherein said silicone rubber material is a material of a class selected from the group of classes, in accordance with Federal Specification ZZ-R-765E, consisting of Class 1A, Class 1B, Class 2A, Class 2B, Class 3A and Class 3B.

10. A gasket arrangement as in claim 9, wherein said silicone rubber material is of Class 3B and Grade 30 in accordance with Federal Specification ZZ-R-765E.

11. A gasket arrangement as in claim 7, wherein said silicone rubber material has a hardness of approximately 30 durometers.

12. A gasket arrangement as in claim 7, wherein said silicone rubber material has resistance to tearing and flexing.

13. A closure-sealing assembly, comprising:

a perimetric channel having a substantially flat base surface which is approximately parallel to the imaginary plane which is approximately defined by said closure;

a perimetric flange;

a gasket member which is made of silicone rubber material and which has a solid rectangular-parallelepipedoid form, a selected finite length and a height approximately 40% its width;

said member characterized by having two longitudinal chamfers and one longitudinal groove, thereby deviating from approximately rectangular-parallelepiped form;

said member having a first lengthwise-widthwise surface and a second lengthwise-widthwise surface which are approximately parallel to each other;

said member being coupled said perimetric channel whereby said first lengthwise-widthwise surface substantially abuts said base surface;

each said chamfer having a breadth approximately 5% said width of said member and being located opposite, with respect to said first lengthwise-widthwise surface of said member, the other said chamfer, at an approximately 45° angle along a lengthwise junction of said first lengthwise-widthwise surface with a lengthwise-heightwise surface of said member;

said groove being approximately semicircularly cylindrical and being located approximately parallel to and approximately intermediate said chamfers, said groove defining an imaginary approximately straight center line which approximately bisects said first lengthwise-widthwise surface, said groove having a radius which is approximately 15% said width of said member; and wherein, when said closure is sealed, said gasket is compressed by said perimetric flange, contactingly with said second lengthwise-widthwise surface, in a direction which is approximately normal to said imaginary plane, said base surface, said first lengthwise-widthwise surface and said second lengthwise-widthwise surface.

14. A closure-sealing assembly as in claim 13, wherein said silicone rubber material has a hardness of approximately 30 durometers.

15. A closure-sealing assembly as in claim 13, wherein said silicone rubber material has resistance to tearing and flexing.

* * * * *